United States Patent [19]
Challberg

[11] Patent Number: 5,319,689
[45] Date of Patent: Jun. 7, 1994

[54] COMPACTABLE PHASE-SEPARATOR ASSEMBLY FOR DUAL-PHASE NUCLEAR REACTOR

[75] Inventor: Roy C. Challberg, Livermore, Calif.

[73] Assignee: General Electric Company, San Jose, Calif.

[21] Appl. No.: 850,369

[22] Filed: Mar. 12, 1992

[51] Int. Cl.$^5$ .............................................. G21C 15/00
[52] U.S. Cl. .................................... 376/371; 376/370
[58] Field of Search ........................ 376/371, 370, 373; 976/DIG. 171

[56] References Cited

U.S. PATENT DOCUMENTS

| | | | |
|---|---|---|---|
| 3,253,999 | 5/1966 | Weisman | 176/55 |
| 3,625,819 | 2/1968 | Sodergard | 376/371 |
| 3,744,593 | 7/1973 | Jones | 187/17 |
| 3,793,142 | 2/1974 | Gunnarsson | 376/293 |
| 4,230,527 | 10/1980 | Cella | 376/402 |
| 4,238,291 | 12/1980 | Nevenfeldt et al. | 376/285 |
| 4,538,365 | 9/1985 | Aho | 34/239 |
| 5,100,609 | 3/1992 | Oosterkamp | 376/210 |

FOREIGN PATENT DOCUMENTS 59-220671 12/1984 Japan .

OTHER PUBLICATIONS

Derwent, AN 85-084839 & JP-A-60 036992 (Hitachi), Feb. 26, 1985.
Patent Abstracts of Japan, vol. 14, No. 581 (p-1147), Dec. 26, 1990 & JP-A-02 251796 (Toshiba), Oct. 9, 1990.
Patent Abstracts of Japan, vol. 13, No. 357 (P-915) (3705), Aug. 10, 1989 & JP-A-01 116497 (Hitachi), May 9, 1989.

Primary Examiner—Donald P. Walsh
Assistant Examiner—Meena Chelliah
Attorney, Agent, or Firm—J. S. Beulick

[57] ABSTRACT

A phase-separator assembly for a boiling-water nuclear reactor includes a steam-separator and a dryer. The steam separator and dryer are mechanically coupled so that relative vertical movement is permitted therebetween. The mechanical coupling limits this relative vertical movement. When installed in a reactor, the steam separator and dryer are independently supported. The dryer is supported so as to define a gap between the dryer and steam separator that optimizes their collective performance. When in storage, the dryer is not independently supported. Instead, the dryer is dropped to a minimum height above the steam separator, providing for compact storage.

14 Claims, 4 Drawing Sheets

COMPACTABLE PHASE-SEPARATOR ASSEMBLY FOR DUAL-PHASE NUCLEAR REACTOR

The Government of the United States has rights to this invention under Contract No. DE-AC03-90SF18495.

BACKGROUND OF THE INVENTION

This invention relates to nuclear reactors and, more particularly, to a phase-separator assembly for a dual-phase nuclear reactor. A major objective of the present invention is to provide for more efficient installation of a steam separator and a dryer in such a reactor and to provide for more compact storage of said components.

Nuclear reactors generate heat in a fissionable reactor core and transfer this heat by flowing coolant through the core. In dualphase reactors, the flowing coolant stores energy, at least partially, in the form of a phase change, e.g., from liquid to vapor. Since dualphase reactors are primarily boiling-water reactors, the phase change is from water to steam. Herein below, the operation of dualphase reactors generally can be extrapolated from the description of boiling-water reactors.

In a boiling-water reactor, a water-steam mixture rises from the core. The water is to be recirculated down a downcomer and then back up through the core. The steam is to be directed from the reactor for utilization; for example, the steam can drive a turbine, which, in turn, can drive a generator to produce electricity. Steam condenses as it gives up energy to the turbine; the condensate can be returned to the reactor vessel to merge with the recirculating water.

While the separation of water and steam is promoted by gravity, small amounts of steam can be entrained in the recirculating water and small amounts of water can be entrained in the steam exiting the reactor vessel. Both of these phenomena interfere with reactor efficiency. Accordingly, many boiling-water reactors include a steam separator that separates the bulk of the water from the steam/water mixture rising from the core. Steam separators typically leave a small amount of water in the rising steam, so dryers are typically disposed above the steam separators to remove the remaining water.

Both steam separators and dryers remove water from steam. The steam separators provide for gross removal, while dryers provide for fine removal. For example, the mixture rising from the core can be 85% steam by weight. With this input, a steam separator can yield a mixture that is 90% steam by weight. The dryer can convert the output of the steam separator to a steam flow that is better than 99.9% steam.

Since the steam separator and dryer are located above the core, they must be removed during refueling operations to gain access to the core. Typically, during a refueling operation, the top head of a reactor vessel is removed. The dryer is then removed and placed at one location within a storage pool. The steam separator is then removed and placed in another location within a storage pool. Fuel bundles are then replaced. The steam separator is then reinstalled and then the dryer is reinstalled. Finally, the reactor vessel is closed and reactor operation resumed.

Considerable effort and cost are consumed in handling and storing these large, contaminated components. Each transfer of a component such as a steam separator or a dryer is a project in itself. When not in the reactor, steam separators and dryers must be stored and enclosed in shielding material, typically a pool of water in a concrete chamber. The size of the chamber must be adequate to accommodate the components to be stored, and the amount of concrete and safety equipment required to service the chamber grows geometrically with the size of the chamber. Thus, reactor plant manufacturing costs and maintenance costs are severely impacted by the size of components such as steam separators and dryers. What is needed is a system that provides the functions of a steam separator and a dryer while requiring fewer component transfers and less storage space.

SUMMARY OF THE INVENTION

In accordance with the present invention, a phase-separator assembly includes both a steam separator and a dryer. The steam separator provides for gross water removal, while the dryer provides fine water removal. A mechanical coupling means joins the steam separator and dryer so that the steam separator is lifted when the dryer is lifted. As a result, steam separator and dryer are moved as a unit, for example, during refueling operations.

The steam separator and dryer are not rigidly coupled. Instead, the mechanical coupling means permits relative vertical movement. In storage, the dryer can sit directly on the steam separator; in this condition, the phase-separator assembly is at its minimum height. When the phase-separator assembly is installed in the reactor, the dryer is supported by structural reactor components and not by the steam separator. Accordingly, the dryer is above its minimum clearance over the steam separator.

During a refueling or other maintenance operation, the steam separator and the dryer are lifted as a unit from the reactor and placed in storage so that the steam separator supports the dryer. Preferably, this step is preceded by a step of lifting the steam separator until it engages the dryer. During subsequent removal of the phase-separator assembly, the steam separator carries the dryer, i.e., bears the predominant portion of its weight.

Subsequently, the separator and the dryer can be lifted as a unit and reinstalled in the reactor so that the dryer is independently supported by structural reactor components and is not supported by the steam separator. In this condition, the combined height of the dryer and the steam separator is at least 1" greater than it is when the dryer and the steam separator are in storage. While 1" is given as a minimum, in practice the height difference is between 12" and 48" for optimal steam separation.

In the prior art, at least twice as many transfer operations were required to transfer the dryer and the steam separator. Such a transfer would require separate storage locations for the dryer and the steam separator. Stacking the dryer and the steam separator in storage would require still further transfer operations and/or more complex transfer operations.

One advantage of the present invention is that the dryer and the steam separator are moved as a unit, minimizing transfer operations. A second advantage is that the dryer and the steam separator are stored as a unit, reducing the storage volume required. Employing a mechanical coupling that allows relative vertical movement permits even further storage volume reductions while permitting the separation between steam separator and dryer to be optimized when they are installed in the reactor. These and other features and advantages of the present invention are apparent in the following description with references to the drawings below.

DESCRIPTION OF THE PREFERRED EMBODIMENTS

Figure 1:
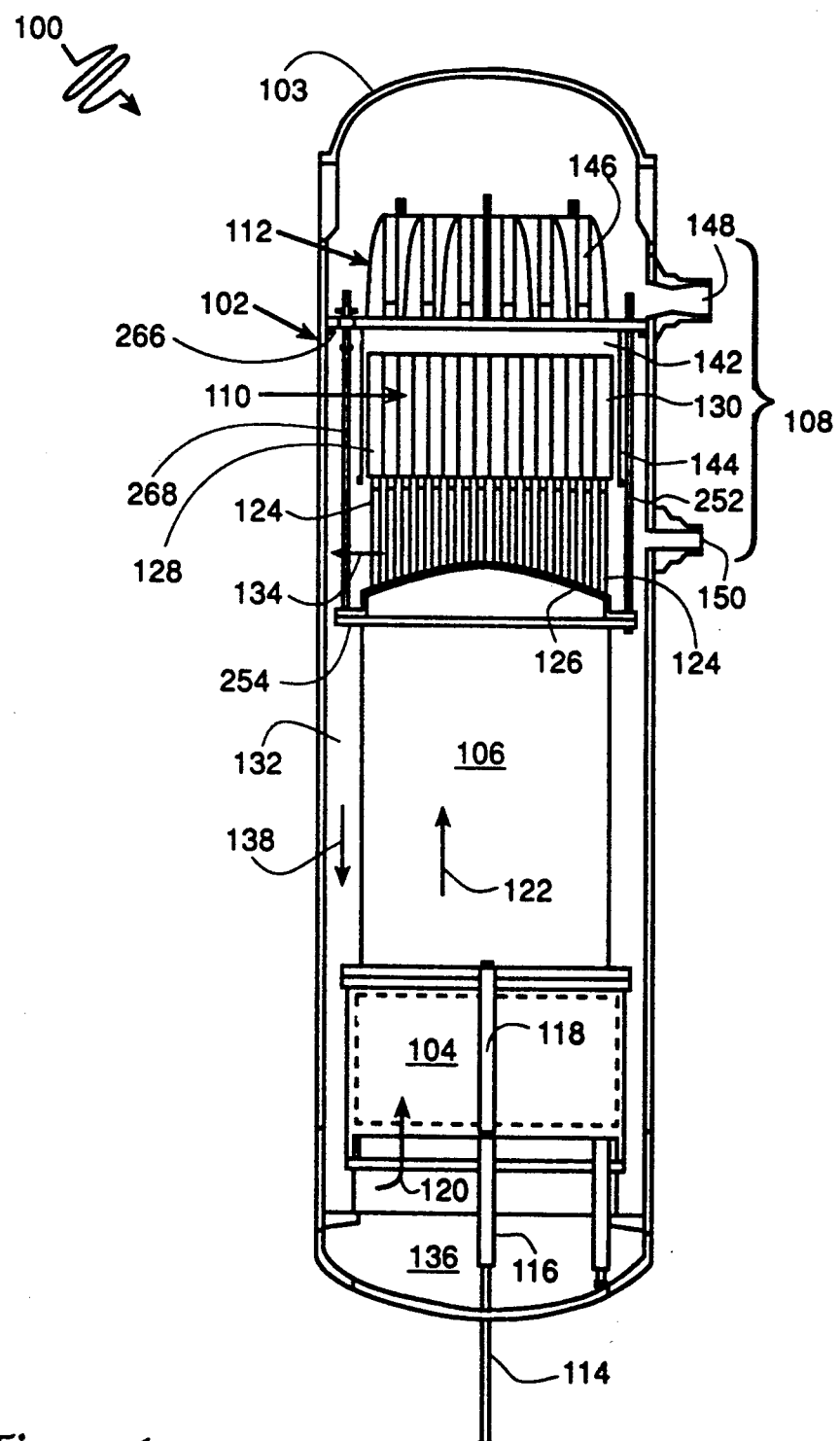
FIG. 1 is a schematic elevational sectional view of a boiling-water reactor including a phase-separator assembly in accordance with the present invention.

In accordance with the present invention, a boiling-water reactor 100 comprises a vessel 102, a core 104, a chimney 106, and a phase-separator assembly 108. Phase-separator assembly 108 includes a steam separator 110, and a dryer 112. Control rod drive housings 114 extend through the bottom of vessel 102 and support control rod guide tubes 116. Control rod guide tubes 116 extend to the bottom of core 104 so that control blades 118 therein can be inserted into and retracted from core 104 to control its power output.

Water enters core 104 from below, as indicated by arrow 120. Heat from core 104 boils the water, yielding a water/steam mixture that is about 85% steam. This mixture is radially confined by chimney 106, flowing upwardly therethrough as indicated by arrow 122. Steam water mixture flows upward from chimney 106; the mixture is forced into risers 124 of steam separator 110 by a domeshaped head 126 of separator 110, The steam/water mixture encounters a swirler 128 at the top of each riser 124. Each swirler 128 imparts a circumferential component to the fluid flow. The resulting centrifugal force causes water to separate from the steam and gather on the walls of a respective three-stage trap 130. Water exiting traps 130 travels generally radially outward to a downcomer 132, as indicated by arrow 134. Water flows down downcomer 132 to lower plenum 136, as indicted by arrow 138. Water in lower plenum 136 flows radially inward and then up into core 104, as indicated by arrow 120, thereby completing the water circulation path.

Steam, along with at most about 10% by weight entrained water, exits the tops of traps 130, and continues rising through a gap 142 between steam separator 110 and dryer 112. Gap 142 is about 27.5" vertically, being optimized for maximum steam separation. Radial motion of the steam is confined by a dryer skirt 144 so steam is guided into dryer 112. Dryer 112 includes dryer elements 146, each of which includes a convoluted path with a multitude of water traps. The trapped water drains downwardly and rejoins the recirculation through downcomer 132.

Steam rising from dryer 112 is at least about 99.9% steam by weight and exits vessel 102 through a main steam fine 148. Main steam line 148 directs the exiting steam to a turbine. The steam drives the turbine, which, in turn, drives a generator to produce electricity. The steam condenses as it gives up energy to the turbine and is returned to the reactor via a fluid handling system. The returning condensate enters the vessel through a feedwater return line 150 and is then merged with water flowing down downcomer 132.

Figure 2:
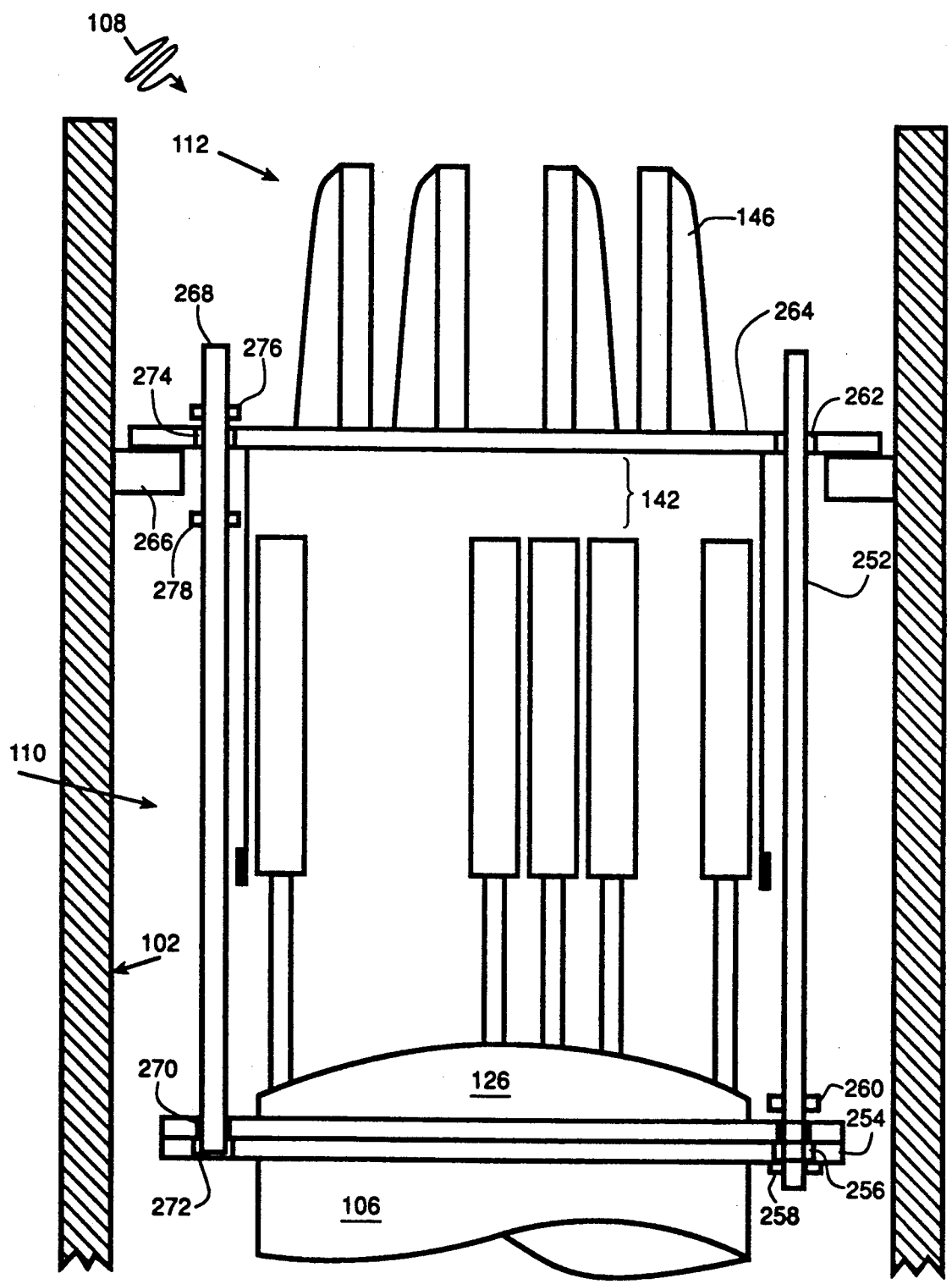
FIG. 2 is an enlarged schematic elevational view of the phase-separator assembly of FIG. 1.

Steam separator 110 is supported from below by chimney 106. Steam separator 110 is attached to chimney 106 by means of 40 bolts 252, as indicated in FIG. 2. A flange 254 of chimney 106 has 40 slots 256 that admit respective pins 258 of bolts 252. Once a pin 258 is below flange 254, the respective bolt 252 can be rotated until its pin 258 is impeded by a stop on flange 254. During reactor operation, flange 254 and separator head 126 expand more than bolts 252. Accordingly, flange 254 and separator head 126 expand against stops 260 of respective bolts 252, securely locking steam separator 110 to chimney 106. Bolts 252 pass through respective bolt access holes 262 in an annular ring 264 of dryer 112.

Dryer 112 is supported by six support blocks 266 that are welded to the interior of vessel 102. Support blocks 266 bear substantially all of the weight of dryer 112; negligible dryer weight is supported by steam separator 110 when phase-separator assembly 108 is installed in reactor 100.

Dryer 112 is mechanically coupled to steam separator 110 by eight lift rods 268. Lift rods 268 are welded through holes 270 in separator head 126 and extend into holes 272 in chimney flange 254. Lift rods 268 also extend through holes 274 of dryer ring 264 so as to permit lift rods 268 to move vertically relative to dryer 112. Lift rods 268 have respective pairs of stops, each pair including an upper stop 276, and a lower stop 278. These stops 276 and 278 define a limited range of vertical travel of dryer 112 relative to steam separator 110.

Figure 3:
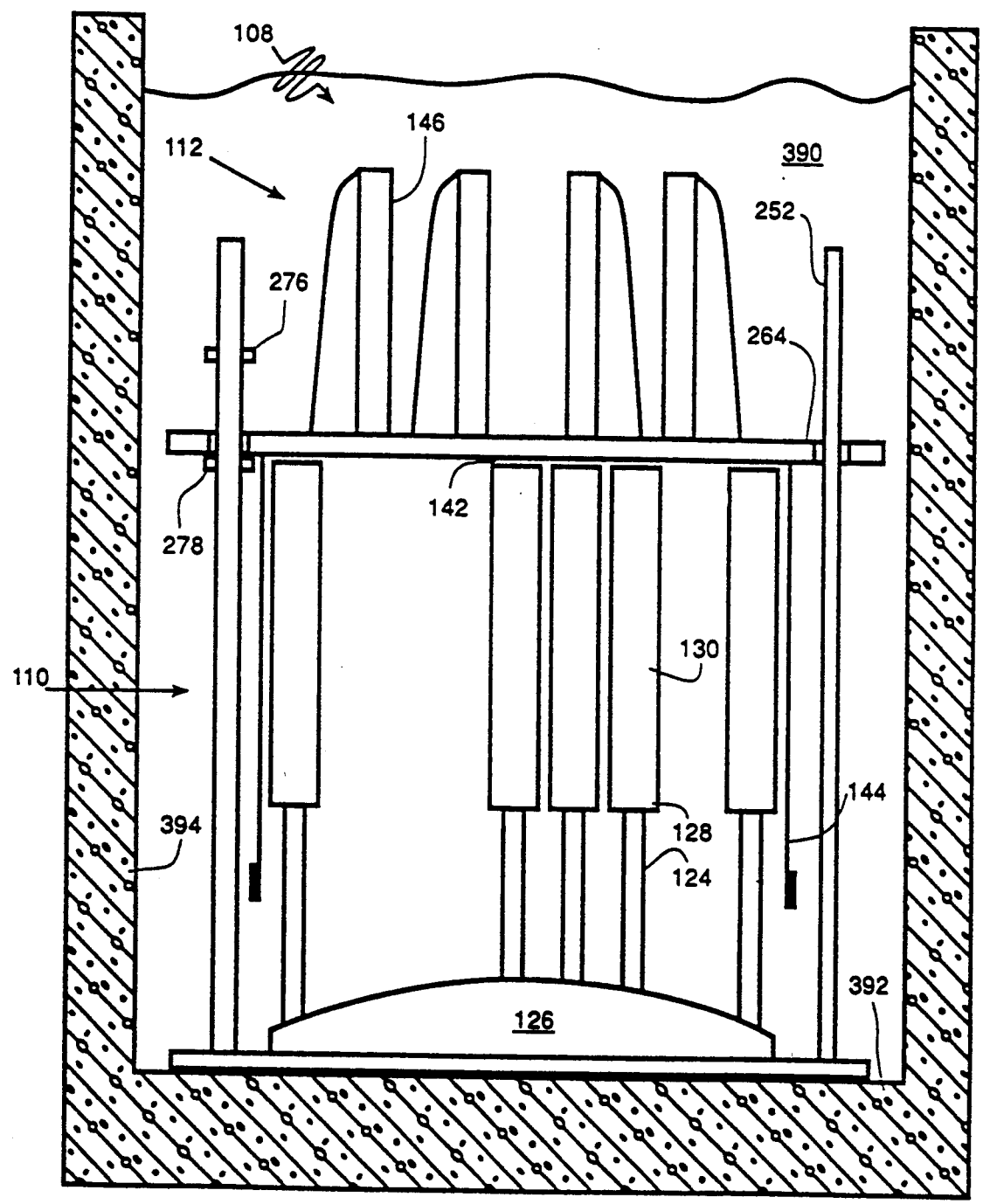
FIG. 3 is a schematic sectional view of the phase-separator assembly of FIG. 1 shown in storage.
Figure 4:
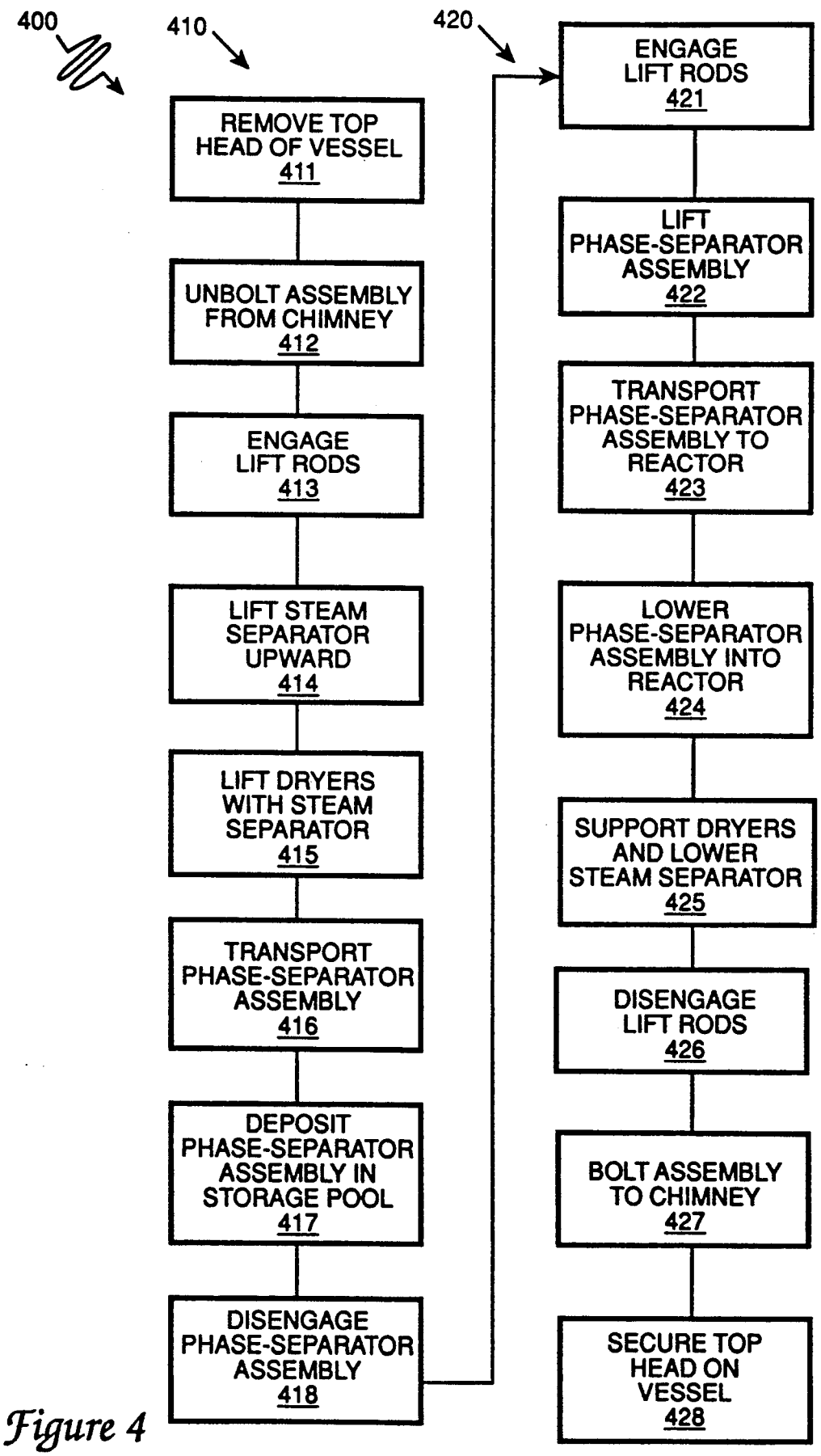
FIG. 4 is a flow chart of a method for transfer the phase-separator assembly of FIG. 1.

When phase-separator assembly 108 is installed in reactor 100, it assumes a height near its maximum. In this situation, dryer ring 264 is substantially nearer to upper stop 276 than to lower stop 278, and gap 142 is at its optimal 27.5", as shown in FIGS. 1 and 2. When phase-separator assembly 108 is in storage, dryer ring 264 contacts lower stops 278, in which condition phase-separator assembly 108 assumes its minimal height and gap 142 is at most a few inches. Phase-separator assembly 108 is shown stored in a storage pool 390 and on a floor 392 of a storage chamber 394 in FIG. 3.

In accordance with a method 400 of the present invention, phase-separator assembly 108 can be removed from reactor 100 to provide access to core 104 for refueling operations and other maintenance operations. Method 400 includes a removal stage 410 in which phase-separator assembly 108 is removed from reactor 100, and an installation stage 420 in which phase-separator assembly 108 is installed or reinstalled in reactor 100.

Removal in accordance with stage 410 begins with the removal and storage of a top head 103 of vessel 102, at step 41 1. In a step 412, bolts 252, FIG. 2, are disengaged from chimney flange 254. At step 413, a crane with a suitable grip engages lift rods 268 and, at step 414, pulls them upward. Since lift rods 268 are rigidly attached to steam separator 110, it is pulled upward as well. However, initially, dryer 112 remains supported on blocks 266. Once lower lift rod stops 278 contact dryer ring 264, dryer 112 lifts with steam separator 110, at step 415. At this point, steam separator 110 and dryer 112 assume their minimum combined height. In this compacted condition, phase-separator assembly 108 is transported to storage pool 390, at step 416. The crane deposits phase-separator assembly 108 on chamber floor 392, at step 417, and disengages at step 418.

With the phase-separator removed, refueling can proceed by the removal and insertion of fuel bundles. Once the transfer of fuel bundles and other maintenance procedures are complete, installation stage 420 begins with the crane engaging lift rods 268, at step 421, and lifting phase-separator assembly 108 from floor 392, at step 422. The next step 423 involves maneuvering phase-separator assembly 108 back into reactor 100. As phase-separator assembly 108 is lowered into reactor 100, at step 424, dryer ring 264 catches on blocks 266 so that the downward movement of dryer 112 is halted. At step 425, the crane continues to lower lift rods 268 until steam separator 110 rests on chimney flange 254. At step 426, the crane disengages. At step 427, bolts 252 are then rotated to the locking position. At step 428, top head 103 is secured on vessel 102, and method 400 is completed.

The present invention provides for variations upon and modifications to the embodiment disclosed above. Different steam separators and dryers can be assembled in the inventive mode. In one alterative, a separator includes a head with a flat configuration rather than the domed configuration of separator head 126. This allows for an even more compact phase-separator assembly. In this embodiment, risers can extend through and below the separator head to be supported by beams within the chimney.

The present invention also provides different means for coupling a steam separator and a dryer. Other variations employ different means for providing for their relative vertical movement and different means for limiting that relative vertical movement. In different reactors, different structural components respectively support the steam separator and the dryer. In addition, transfer means other than a crane can be used to transfer the phase-separator assembly. These and other modifications to and variations upon the described embodiments are provided for by the present invention, the scope of which is limited only by the following claims.

What is claimed is:

1. A Phase-separator assembly for a dual-phase reactor comprising:
   a steam separator for removing liquid from a vapor/liquid mixture;
   a dryer for removing further liquid from said vapor/liquid mixture exiting from said steam separator;
   mechanical coupling means for mechanically coupling said steam separator and said dryer so as to permit relative vertical movement of said dryer relative to said steam separator, thereby defining a minimum combined height, said mechanical coupling means coupling said steam separator and said dryer so that said dryer is disposed above said steam separator when said phase-separator assembly is in use; and
   reactor engagement means for mechanically coupling said dryer and steam separator with structural components of said reactor so that when installed in said reactor said phase-separator assembly has an in-reactor combined height at least 1" greater than said minimum combined height;
   whereby, said combined height can be less when said separators are in storage than said combined height is when said steam separator and said dryer are in use.

2. A phase-separator assembly as recited in claim 1 wherein said reactor engagement means includes separator engagement means and dryer engagement means, said separator engagement means providing for support of said steam separator by said structural components, said dryer engagement means providing for independent support of said dryer by said structural components so that said steam separator does not support said dryer when said phase-separator assembly is in use.

3. A phase-separator assembly as recited in claim 2 wherein said steam separator supports said dryer while said phase-separator assembly is in storage.

4. A method of transferring a steam separator and a dryer out of a dual-phase nuclear reactor, said steam separator and said dryer being installed in said nuclear reactor as an assembly having a predetermined height, comprising the steps of manipulating said separator-dryer assembly to have a compressed height which is less than said predetermined height, and lifting said separator-dryer assembly with compressed height out of said reactor as a unit.

5. The method as recited in claim 4, further comprising the step of storing said separator-dryer assembly with compressed height in a storage pool so that said steam separator supports said dryer.

6. The method as recited in claim 5, further comprising the steps of:
   lifting said separator-dryer assembly with compressed height as a unit out of said storage pool; and
   installing said separator-dryer assembly in said reactor so that structural components of said reactor support said dryer independent of said steam separator, whereby said predetermined height of said separator-dryer assembly in said reactor is at least 1" greater than said compressed height.

7. The method as recited in claim 4, wherein said manipulating step entails lifting said steam separator until it engages said dryer so that said dryer is carried by said steam separator during said step of lifting as a unit.

8. A separator-dryer assembly for a dual-phase reactor, comprising:
   a steam separator for removing less than all of the liquid from a vapor/liquid mixture;
   a dryer for removing a further amount of liquid from the vapor/liquid mixture exiting from said steam separator; and
   means for coupling said steam separator and said dryer so that said steam separator is movable relative to said dryer between first and second positions, said assembly having a predetermined height when said steam separator is in said first position and a compressed height when said steam separator is in said second position, wherein said compressed height is less than said predetermined height.

9. The separator-dryer assembly as recited in claim 8, wherein the difference between said compressed height and said predetermined height is at least one inch.

10. The separator-dryer assembly as recited in claim 8, wherein said coupling means is rigidly connected to said steam separator and is not rigidly connected to said dryer.

11. The separator-dryer assembly as recited in claim 10, wherein said coupling means comprise first means for stopping movement of said steam separator relative to said dryer beyond said first position in a direction away from said second position and second means for stopping movement of said steam separator relative to said dryer beyond said second position in a direction away from said first position.

12. A method of storing a separator-dryer assembly in a storage pool, said separator-dryer assembly having a predetermined height when installed in a nuclear reactor, comprising the steps of:

manipulating said separator-dryer assembly to have a compressed height which is less than said predetermined height wherein said separator supports said dryer; and submerging said separator-dryer assembly with compressed height in said storage pool.

13. The method as recited in claim 12, wherein said manipulating step is performed while said separator-dryer assembly is installed in said nuclear reactor, further comprising the step of lifting said separator-dryer assembly out of said nuclear reactor as a unit.

14. The method as recited in claim 13, wherein said manipulating step entails lifting said steam separator until it engages said dryer so that said dryer is carried by said steam separator during said step of lifting as a unit.

* * * * *